Dec. 23, 1952          F. M. FRAGA          2,622,499
AUTOMATIC DEPTH-REACTION CONTROL FOR TRACTOR MOUNTED IMPLEMENTS
Filed May 22, 1950
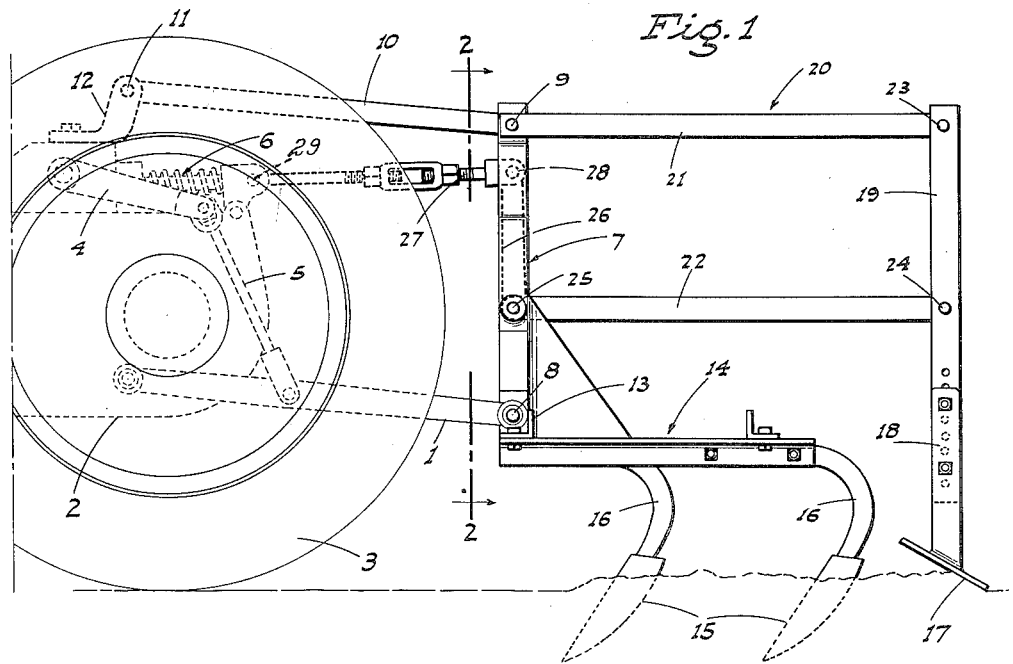
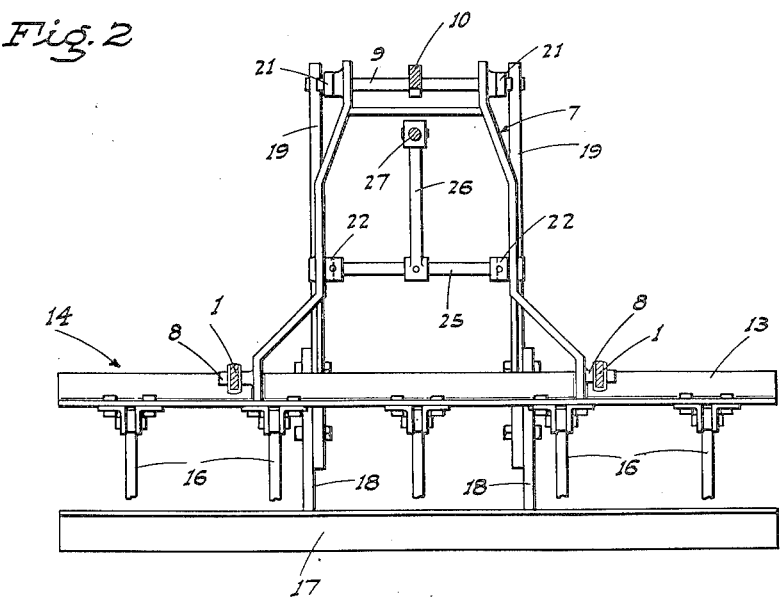
INVENTOR
*Frank M. Fraga*
BY
ATTORNEYS Patented Dec. 23, 1952

2,622,499

UNITED STATES PATENT OFFICE 2,622,499

AUTOMATIC DEPTH-REACTION CONTROL FOR TRACTOR MOUNTED IMPLEMENTS

Frank M. Fraga, Fresno, Calif.

Application May 22, 1950, Serial No. 163,471

1 Claim. (Cl. 97—50)

The present invention is adapted for use with a tractor which includes a power actuated, lift-type hitch for a trailing implement; the hitch including a longitudinally shiftable member whose motion forward or rearward results in power raising or lowering, respectively, of said hitch.

In certain existing lift type implement mounts, for tractors including a hitch as above, excessive drag of the trailing implement is converted to longitudinal motion of said shiftable member whereby to cause the hitch to automatically lift the implement and relieve such excessive drag.

A prime object of this invention is to provide an automatic depth control implement mount, for connection to a lift-type tractor hitch of the type described, which is effective to automatically maintain a selected working depth of the implement irrespective of any variation in drag of the latter; the mount including a feeler element which rides the ground to the rear, or ahead, of the implement, and vertical motion of said feeler element in response to rise or fall of ground contour being converted to forward or rearward longitudinal motion of said shiftable member of the hitch whereby the implement is caused to correspondingly rise or fall.

A further object of the invention is to provide an implement mount, as above, wherein the feeler element is in the form of a transverse blade which also functions to smooth the ground after tillage thereof by the implement.

An additional object of the invention is to provide an implement mount, for the purpose described, which includes a novel linkage and lever arrangement, between the ground contour responsive feeler element and the longitudinally shiftable member of the hitch, operative to attain a positive and effective motion of the member in response to vertical motion of said element.

Another object of the invention is to provide an implement mount which, by reason of the automatic depth control, prevents undesirable digging-in of the implement beyond the point of normal penetration, and thus conditions of excessive drag are substantially eliminated.

Still another object of the invention is to provide an automatic depth control for implements which is not subject to any adverse action resulting from suction of the teeth of a cultivator, or the shares of a plow, or the weight of the load in an implement such as a scraper.

A further object of the invention is to provide an implement which is designed for ease and economy of manufacture.

Still another object of the invention is to provide a practical and reliable implement mount, and one which will be exceedingly effective for the purpose for which it is designed.

These objects are accomplished by means of such structure and relative arrangement of parts as will fully appear by a perusal of the following specification and claim.

In the drawings:

Fig. 1 is a side elevation of the novel implement mount as in use.

Fig. 2 is a transverse section on line 2—2 of Fig. 1.

Referring now more particularly to the characters of reference on the drawings, the invention is adapted for use with a tractor of the type having a power actuated lift type hitch; said hitch including vertically swingable, transversely spaced draft links 1 which project rearwardly from the tractor body 2 between the rear wheels 3. The draft links 1 are swung up or down by corresponding power actuated lift arms 4 connected to said links 1 by rods 5.

Power actuation of the lift arms 4 is controlled by hydraulic mechanism on the tractor which includes a longitudinally shiftable member 6; advance of said member resulting in power lift of the arms 4, while retraction of said member lowers said arms.

The automatic depth control implement mount comprises an upstanding frame 7 of generally A-shape; such frame being fitted, at its lower ends, with outwardly projecting trunnions 8 which pivotally connect with the rear ends of the vertically swingable draft links 1.

At the top thereof the upstanding A-frame 7 includes an upper cross shaft 9, and a central, longitudinal stay bar 10 extends forwardly from the upper cross-shaft 9 to pivotal connection, as at 11, to an anchor bracket 12 on the top of the tractor body 2 at the rear thereof; the stay bar 10 being some distance above the longitudinally shiftable member 6.

The transversely spaced draft links 1, and the stay bar 10, are substantially parallel whereby when said links are swung up or down by the lift arms 4, the frame 7—as vertically adjusted—remains substantially perpendicular.

At its lower end the upstanding frame 7 is fixed to the front bar 13 of a transversely extending tool supporting frame, indicated generally at 14.

A plurality of earth working tools 15 are disposed below the frame 14, being secured to the latter by standards 16.

The purpose of the present invention is to cause the earth working tools 15 to run at all times with constant depth or penetration into the ground, regardless of the drag which said tools impose on the hitch. This is accomplished in the following manner:

A ground engaging feeler element 17, here in the form of a transverse blade, inclined upwardly and forwardly, is disposed to the rear of the tools 15 and is thus positioned to ride on the ground tilled by said tools.

Transversely spaced standards 18 are fixed on the blade 17, and vertically adjustably connect with corresponding posts 19.

A longitudinally extending, parallel linkage assembly, indicated generally at 20, connects each of the posts 19 with the corresponding side of the upstanding frame 7; each such assembly including upper links 21 and lower links 22. The links 21 and 22 are pivoted, at their rear ends, as at 23 and 24 respectively, to the corresponding posts 19.

The upper links 20 are pivoted, at their forward ends, to the upper cross shaft 9, while the forward ends of the lower links 22 are fixed to a lower cross shaft 25 which extends between opposite sides of the upstanding frame 7.

A radial lever 26 is fixed centrally on the lower cross shaft 25 and upstands therefrom, a longitudinal reaction link 27 being pivoted at its rear end, as at 28, to the upper end of the lever arm 26, and pivoted, at its forward end, as at 29, to the longitudinally shiftable member 6 of the power lift control mechanism (not otherwise shown) of the tractor.

When the above described invention is in use, the feeler element, to-wit, the transverse blade 17, trails the earth working tools 15, and closely follows ground contour with rise or fall in such ground contour. The feeler element 17, together with the standards 18 and posts 19, correspondingly rise and fall, swinging the parallel linkage assemblies 20 up or down.

Upon the parallel linkage assemblies 20 being swung upwardly, the radial lever 26 swings forwardly, imparting a corresponding thrust through the reaction link 27 to the longitudinally shiftable member 6. As said member 6 moves forward, the lift arms 4 are automatically power lifted to a certain extent, imparting a lift to the links 1 and consequently to the tools 15.

Similarly, upon the parallel linkage assemblies 20 swinging downwardly, as when the feeler element 17 rides into a depression, the radial lever arm 26 swings backwardly, imparting backward pull on the reaction link 27 and like motion to the longitudinally shiftable member 6. This results in the arms 4 being automatically swung downward, thrusting the links 1 and tools 15 in a corresponding direction.

It will thus be evident that as the tractor moves forward and the implement traverses the ground, the tools 15 will be automatically maintained at a substantially constant depth of penetration, irrespective of undulation in ground contour. In short, as the tools engage a high spot they will be automatically raised, and when they enter a depression will be lowered; all without any attention on the part of the tractor operator.

In addition to its function as a feeler element the transverse blade 17 serves to flatten or smooth the ground rearwardly of the earth working tools 15, thus serving a dual purpose.

From the foregoing description it will be readily seen that there has been produced such a device as substantially fulfills the objects of the invention, as set forth herein.

While this specification sets forth in detail the present and preferred construction of the device, still in practice such deviations therefrom may be resorted to as do not form a departure from the spirit of the invention, as defined by the appended claim.

Having thus described the invention, the following is claimed as new and useful, and upon which Letters Patent are desired:

In a tractor-hitch and implement mount which includes transversely spaced vertically movable power actuated draft links on the tractor, a movable reaction member on the tractor, a longitudinal stay bar above the member pivoted at its forward end on the tractor, and an implement supporting frame which includes an upstanding portion pivoted at its lower end to the draft links and at its upper end to the stay bar; a vertically movable feeler separate from the frame and engaging the ground to the rear of the frame, an upstanding arm unit rigid with the feeler, a longitudinal link connecting the arm unit and upstanding frame portion intermediate its ends and below the level of the reaction member, another longitudinal link connecting the arm unit and frame portion in vertically spaced relation to the first link, the links being substantially parallel, an arm rigid with and upstanding from the first named link adjacent its forward end, and a longitudinal reaction link connecting the upper end of said upstanding arm and the reaction member.

FRANK M. FRAGA.

REFERENCES CITED

The following references are of record in the file of this patent:

UNITED STATES PATENTS

| Number | Name | Date |
| --- | --- | --- |
| 2,456,693 | Fraga | Dec. 21, 1948 |
| 2,527,840 | Mott | Oct. 31, 1950 |

FOREIGN PATENTS

| Number | Country | Date |
| --- | --- | --- |
| 72,464 | Norway | Aug. 18, 1947 |